United States Patent [19]

De Jong et al.

[11] Patent Number: 5,218,085
[45] Date of Patent: Jun. 8, 1993

[54] PREPARATION OF HIGH MOLECULAR WEIGHT CARBON MONOXIDE/STYRENE COPOLYMERS

[75] Inventors: Abe W. De Jong; Johannes J. Keijsper, both of Amsterdam, Netherlands

[73] Assignee: Shell Oil Company, Houston, Tex.

[21] Appl. No.: 790,894

[22] Filed: Nov. 12, 1991

[30] Foreign Application Priority Data

Nov. 13, 1990 [NL] Netherlands ............... 9002476

[51] Int. Cl.⁵ .............................. C08G 67/02
[52] U.S. Cl. .................... 528/392; 528/86; 528/205
[58] Field of Search ............... 528/392, 86, 205

[56] References Cited

U.S. PATENT DOCUMENTS

| | | | |
|---|---|---|---|
| 4,786,714 | 11/1988 | Drent | 528/392 |
| 4,788,279 | 11/1988 | Drent | 528/392 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,880,903 | 11/1989 | Van Broekhoven et al. | 528/392 |
| 4,965,341 | 10/1990 | Van Doorn et al. | 528/392 |

FOREIGN PATENT DOCUMENTS

| | | |
|---|---|---|
| 229408 | 7/1987 | European Pat. Off. . |
| 345847 | 12/1989 | European Pat. Off. . |
| 349084 | 1/1990 | European Pat. Off. . |

OTHER PUBLICATIONS

Search Report EPO (enclosed) Jul. 1992.

*Primary Examiner*—Harold D. Anderson

[57] ABSTRACT

Novel polymers of carbon monoxide with styrene and/or with one or more substituted styrenes having a $\overline{M}_n > 30,000$ are prepared by contacting the monomers with a catalyst composition formed from a palladium compound, a strong acid with a pKa less than $-3$, a nitrogen bidentate ligand, and an organic oxidizing agent.

15 Claims, No Drawings

PREPARATION OF HIGH MOLECULAR WEIGHT CARBON MONOXIDE/STYRENE COPOLYMERS

FIELD OF THE INVENTION

The invention relates to novel polymers of carbon monoxide with styrene and/or with one or more substituted styrenes.

BACKGROUND OF THE INVENTION

Linear polymers of carbon monoxide with one or more olefinically unsaturated aliphatic compounds are made up of polymer units from carbon monoxide and units from the olefinically unsaturated compounds which are present in a substantially alternating arrangement. These linear polymers can be prepared by contacting the monomers at elevated temperature and pressure with a catalyst composition which comprises a Group VIII metal compound, a phosphorus bidentate ligand, an acid with a pKa<2 and an organic oxidizing agent.

For some applications it may be desirable to have such linear alternating polymers in which optionally substituted phenyl groups occur as side groups linked to the main chains. Attempts using the above-mentioned catalyst compositions to prepare such polymers from a monomer mixture that besides carbon monoxide contains styrene and/or one or more substituted styrenes have had little success up to now. Although these catalyst compositions are eminently suitable for the preparation of linear alternating polymers of carbon monoxide with one or more olefinically unsaturated aliphatic compounds, they have been found less suitable for the preparation of linear alternating polymers of carbon monoxide with styrene and/or with one or more substituted styrenes.

In the course of an investigation concerning these polymers carried out previously by the applicant it was found that starting from monomer mixtures which besides carbon monoxide contain styrene and/or one or more substituted styrenes, linear alternating polymers can be prepared, provided that the phosphorus bidentate ligand in the above-described catalyst compositions is replaced by one of the following three bidentate ligands.

1) a nitrogen bidentate ligand with the general formula

wherein X and Y represent identical or different organic bridging groups and X and Y each contain three or four atoms in the bridge, and at least two of which are carbon atoms, 2) a sulphur bidentate ligand with the general formula $(R_1)S\text{-}R\text{-}S(R_2)$ in which $R_1$ and $R_2$ represent identical or different optionally polar-substituted hydrocarbon groups and R is a divalent organic bridging group containing at least two carbon atoms in the bridge, and 3) a nitrogen bidentate ligand in which a $(R_3)N$ group occurs, the nitrogen atom of which is connected solely via a non-aromatic double bond with a carbon atom of a hydrocarbon bridging group $R_4$ and in which moreover either (i) a $(R_5)N$ group occurs, the nitrogen atom of which is connected via a double bond with a carbon atom of the bridging group $R_4$, or (ii) a $(R_5)(R_6)N$ group is present, the nitrogen atom of which is connected via a single bond with a carbon atom of the bridging group $R_4$, wherein in the above-mentioned groups $R_3$ represents a monovalent hydrocarbon group and $R_5$ and $R_6$ are identical or different hydrocarbon groups, optionally the same as $R_3$.

In the polymer preparations carried out until recently, use was made of, inter alia, catalyst compositions which contained one of the following bidentate ligands: 2,2'-bipyridine, 1,10-phenanthroline, 1,2-bis(ethylthio)ethane, cis-1,2-bis(benzylthio)ethene and (cyclohexyl)N=C(H)—C(H)=N(cyclohexyl). Trifluoroacetic acid or para-toluenesulphonic acid were usually used as acids. The quantity of organic oxidizing agent in the catalyst compositions was, as a rule, 100–300 mol per g.atom Group VIII metal. The above-mentioned polymerizations were usually performed at a temperature selected between 50° and 100° C. such as to satisfy the practical requirement that the resulting reaction rate should be at least 50 g polymer/(g Group VIII metal.hour). Polymers were obtained from these polymerizations having an average molecular weight, calculated as number average ($\overline{M}_n$), of less than 20,000.

For some applications it may be desirable to have such polymers with an $\overline{M}_n$ of above 30,000. An investigation has been carried out by the applicant concerning the preparation of these polymers. The investigation showed that it is not possible to prepare such polymers at an acceptable reaction rate using the previously used catalyst compositions. Although it is possible, by reducing the reaction temperature, to obtain some increase in the $\overline{M}_n$ of the polymers, this is accompanied by such a sharp reduction in the reaction rate that very soon the desired reaction rate of 50 g/(g.hour) is no longer satisfied. In general, it can be stated that with the catalyst compositions used to date it has not been found possible in the preparation of linear alternating polymers of carbon monoxide with styrene and/or with one or more substituted styrenes to prepare polymers with an $\overline{M}_n$ of above 30,000 at a reaction rate of least 50 g/(g.hour).

In the course of continued research by the applicant into this subject it has now surprisingly been found that both the previously mentioned criteria can be satisfied if a catalyst composition is used which contains a nitrogen bidentate ligand mentioned under (1) above and an acid with a pKa<−3. Polymers of the present type with an $\overline{M}_n$ of above 30,000 are novel.

SUMMARY OF THE INVENTION

The invention therefore relates to novel linear polymers of carbon monoxide with styrene and/or with one or more substituted styrenes in which polymer units from carbon monoxide on the one hand and the units from the styrene monomers on the other hand are present in a substantially alternating arrangement wherein the polymer has an $\overline{M}_n$ of above 30,000. The present invention further relates to a process for the preparation of these polymers by contacting the monomers at elevated temperature and pressure with a catalyst composition comprising a) a Group VIII metal compound, b) a nitrogen bidentate ligand with the general formula

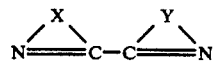

wherein X and Y are as defined under (1) above, c) an acid with a pKa<−3 and d) an organic oxidizing agent.

The invention also relates to shaped objects consisting at least partly of these polymers.

DETAILED DESCRIPTION OF THE INVENTION

Substituted styrenes which can be used in the preparation of the polymers according to the invention include compounds which consist solely of carbon and hydrogen such as 2-methylstyrene, 4-methylstyrene and 4-ethylstyrene, as well as compounds which besides carbon and hydrogen also contain one or more heteroatom substituents such as 4-methoxystyrene and 4-chlorostyrene. The invention is particularly important for the preparation of high molecular weight copolymers of carbon monoxide with styrene.

In this specification, Group VIII metals are understood to be the noble metals ruthenium, rhodium, palladium, osmium, iridium and platinum, as well as the iron group metals iron, cobalt and nickel.

In the catalyst compositions used in the polymer preparation according to the invention, the Group VIII metal is preferably selected from palladium, nickel and cobalt. Palladium is particularly preferred as Group VIII metal. The incorporation of the Group VIII metal in the catalyst compositions preferably takes place in the form of a salt of a carboxylic acid, and in particular in the form of an acetate.

In the nitrogen bidentate ligands which are suitable for use as component b) in the catalyst compositions, the bridging groups X and Y are connected with each other via the two carbon atoms depicted in the general formula. Besides this connection, there may additionally exist between the bridging groups X and Y a second connection such as in 1,10-phenanthroline and compounds derived therefrom. If the bridging groups X and Y also contain other atoms in the bridge besides carbon atoms, these atoms are preferably nitrogen atoms. There is additionally preference for nitrogen bidentate ligands in which the bridging groups X and Y are identical. Examples of suitable nitrogen bidentate ligands are 2,2'-bipyridine and compounds derived therefrom such as 3,3'-azo-2,2'-bipyridine and 4,4'-dimethyl-2,2'-bipyridine, 1,10-phenanthroline and compounds derived therefrom such as 4,7-dimethyl-1,10-phenanthroline and also 2,2'-biquinoline and 2-(2-pyridyl)benzimidazole. The use of 2,2'-bipyridine and 1,10-phenanthroline as component b) is preferred. The nitrogen bidentate ligand is preferably present in the catalyst compositions in a quantity of 0.5–100 and in particular 1–50 mol per g.atom Group VIII metal.

The acids which are employed as component c) in the catalyst compositions should have a $pKa < -3$. Examples of such very strong acids are tetrafluoroboric acid (HBF$_4$), hexafluorophosphoric acid (HPF$_6$), hexafluoroantimonic acid (HSbF$_6$), hexafluorosilicic acid (H$_2$SiF$_6$), para-nitrobenzenesulphonic acid (p—O$_2$N—C$_6$H$_4$—SO$_3$H), trifluoromethanesulphonic acid (F$_3$C—SO$_3$H), methylbisulphate ((CH$_3$O)—SO$_3$H), sulphuric acid (H$_2$SO$_4$) and fluorosulphurous acid (FSO$_3$H).

The use of trifluoromethanesulphonic acid as component c) is preferred. The acid is preferably present in the catalyst compositions in a quantity of 1–100 and in particular 2–50 mol per g.atom Group VIII metal. Besides the components a)-c) the catalyst compositions should contain as component d) an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-benzoquinone or 1,4-naphthoquinone is preferably used as component d).

As mentioned above, the process for the preparation of linear alternating polymers of carbon monoxide with styrene and/or with one or more substituted styrenes with an $\overline{M}_n < 20,000$, catalyst compositions were used in the past which contained 100–300 mol organic oxidizing agent per g.atom Group VIII metal. In the applicant's research that led to the invention to which the present patent application relates, it has surprisingly been found that the use of such large quantities of organic oxidizing agent in the catalyst compositions is by no means necessary. It has been discovered that a drastic reduction in the quantity of organic oxidizing agent in the catalyst compositions leads to a substantial increase in the $\overline{M}_n$ of the prepared polymers. On the basis of the results of this research there is preference, in the preparation of the present high molecular weight polymers, for catalyst compositions containing only 2.5–50 and in particular only 5–25 mol organic oxidizing agent per g.atom Group VIII metal. The preparation of the polymers according to the invention is preferably carried out by contacting the monomers with a solution of the catalyst compositions in a diluent in which the polymers are insoluble or virtually insoluble. Lower aliphatic alcohols such as methanol are very suitable as diluents.

In the applicant's research that led to the present invention, it has surprisingly been found that the quantity of water present in the reactor has an influence on the $\overline{M}_n$ of the prepared polymers. It has been found that reduced amounts of water in the reactor result in higher polymer $\overline{M}_n$ in the preparation of linear alternating polymers of carbon monoxide with styrene and/or with one or more substituted styrene polymers. The water that may be present in the reactor can result from the use of water containing styrene or water-containing substituted styrenes or by the use of a water-containing diluent such as water-containing methanol. From the research carried out by the applicant it has been found that, if no special precautions are taken, the polymerization mixture typically contains more than 100 ppmw water. On the basis of the results of the research, there is preference in the preparation of the present high-molecular weight polymers for the use of mixtures to be polymerized which preferably contain less than 50 and in particular less than 25 ppmw water. This low water content can be achieved by using carefully dried starting materials, in particular dried styrene and/or dried substituted styrenes and, if a diluent has been used, also drying this beforehand. A simpler solution to this problem is to perform the drying in situ by, before polymerization, adding a drying agent to the mixture to be polymerized. A mixture of trimethylorthoformiate and para-toluenesulphonic acid has been found to be very suitable for this purpose.

The quantity of catalyst composition used in the preparation of the polymers can vary within wide limits. A quantity of catalyst composition is preferably used which contains $10^{-7}$–$10^{-3}$ and in particular $10^{-6}$–$10^{-4}$ g.atom Group VIII metal per mol of styrene and/or substituted styrene to be polymerized.

The preparation of the polymers is preferably carried out at a temperature of 25°–150° C. and a pressure of 2–150 bar and in particular at a temperature of 30°–120° C. and a pressure of 5–100 bar.

The polymers according to the invention can be prepared either batchwise or continuously. If desired, the polymer preparation can also be carried out in the gaseous phase.

The ranges and limitations provided in the instant specification and claims are those which are believed to particularly point out and distinctly claim the instant invention. It is, however, understood that other ranges and limitations that perform substantially the same function in substantially the same way to obtain substantially the same results are intended to be within the scope of the instant invention as defined by the instant specification and claims.

EXAMPLES

The invention will be described by the following examples which are provided for illustrative purposes and are not to be construed as limiting the invention.

EXAMPLE 1

A carbon monoxide/styrene copolymer was prepared as follows. Into a stirred autoclave with a volume of 300 ml which contained 100 ml styrene, a catalyst solution was introduced consisting of:
  20 ml methanol,
  0.2 mmol palladium acetate,
  4.4 mmol 2,2'-bipyridine,
  6.0 mmol para-toluenesulphonic acid, and
  20.0 mmol 1,4-naphthoquinone.

After removing air from the autoclave, 40 bar carbon monoxide was forced in. The temperature was then raised to 70° C. The pressure was kept constant during polymerization by forcing in carbon monoxide. After 5 hours the polymerization was terminated by cooling to room temperature and releasing the pressure. The polymer was filtered off, washed with methanol and dried. 42.0 g copolymer with an $\overline{M}_n$ of 10,000 was obtained. The polymerization rate was 395 g copolymer/(g palladium.hour).

EXAMPLE 2

A carbon monoxide/styrene copolymer was prepared in substantially the same way as in example 1, but with the following differences:
  a) the reaction temperature was 46° C. instead of 70° C., and
  b) the reaction time was 18 hours instead of 5 hours.

13.7 g copolymer with an $\overline{M}_n$ of 19,000 was obtained. The polymerization rate was 36 g copolymer/(g palladium.hour).

EXAMPLE 3

A carbon monoxide/styrene copolymer was prepared in substantially the same way as in example 1, but with the following differences:
  a) a catalyst solution was used consisting of:
  20 ml methanol,
  0.06 mmol palladium acetate,
  1.3 mmol 2,2'-bipyridine,
  1.7 mmol para-toluenesulphonic acid, and
  9.5 mmol 1,4-naphthoquinone,
  b) after addition of the catalyst solution, the water content of the autoclave contents was reduced from >200 ppmw to <25 ppmw by addition of 18 mmol trimethylorthoformiate and 0.01 mmol para-toluenesulphonic acid, and
  c) the reaction time was 3.6 hours instead of 5 hours.

14.3 g copolymer with an $\overline{M}_n$ of 11,600 was obtained. The polymerization rate was 622 g copolymer/(g palladium.hour).

EXAMPLE 4

A carbon monoxide/styrene copolymer was prepared in substantially the same way as in example 1, but with the following differences:
  a) a catalyst solution was used consisting of:
  20 ml methanol,
  0.06 mmol palladium acetate,
  1.9 mmol 2,2'-bipyridine,
  1.25 mmol para-toluenesulphonic acid, and
  9.5 mmol 1,4-naphthoquinone,
  b) after addition of the catalyst solution, the water content of the autoclave contents was reduced from >200 ppmw to <25 ppmw by addition of 35 mmol trimethylorthoformiate and 0.02 mmol para-toluenesulphonic acid,
  c) the reaction temperature was 72° C. instead of 70° C., and
  d) no carbon monoxide was forced in during the polymerization.

26.6 g copolymer with an $\overline{M}_n$ of 13,000 was obtained. The polymerization rate was 833 g copolymer/(g palladium.hour).

EXAMPLE 5

A carbon monoxide/styrene copolymer was prepared in substantially the same way as in example 1, but with the following differences:
  a) a catalyst solution was used consisting of:
  20 ml methanol,
  0.06 mmol palladium acetate,
  1.9 mmol 2,2'-bipyridine,
  1.25 mmol para-toluenesulphonic acid, and
  1.3 mmol 1,4-naphthoquinone,
  b) the water content was reduced to <25 ppmw as in example 3,
  c) the reaction time was 6 hours instead of 5 hours, and
  d) no carbon monoxide was forced in during the polymerization.

15.2 g copolymer with an $\overline{M}_n$ of 16,000 was obtained. The polymerization rate was 396 g copolymer/(g palladium.hour).

EXAMPLE 6

A carbon monoxide/styrene copolymer was prepared in substantially the same way as in example 1, but with the following differences:
  a) a catalyst solution was used consisting of:
  20 ml methanol,
  0.06 mmol palladium acetate,
  1.9 mmol 2,2'-bipyridine,
  1.25 mmol para-toluenesulphonic acid, and
  0.6 mmol 1,4-naphthoquinone,
  b) the water content was reduced to <25 ppmw as in example 3, and
  c) no carbon monoxide was forced in during the polymerization.

8.9 g copolymer with an $\overline{M}_n$ of 18,300 was obtained. The polymerization rate was 278 g copolymer/(g palladium.hour).

EXAMPLE 7

A carbon monoxide/styrene copolymer was prepared in substantially the same way as in example 1, but with the following differences.

a) the catalyst solution contained 6.0 mmol trifluoromethanesulphonic acid instead of para-toluenesulphonic acid, b) the reaction temperature was 71° C. instead of 70° C., and c) the reaction time was 2.9 hours instead of 5 hours.

37.7 g copolymer with an $\overline{M}_n$ of 31,000 was obtained. The polymerization rate was 611 g copolymer/(g palladium.hour).

EXAMPLE 8

A carbon monoxide/styrene copolymer was prepared in substantially the same way as in example 1, but with the following differences:

a) a catalyst solution was used consisting of:
20 ml methanol,
0.06 mmol palladium acetate,
0.31 mmol 2,2'-bipyridine,
1.13 mmol trifluoromethanesulphonic acid, and
0.63 mmol 1,4-naphthoquinone, b) 42 bar carbon monoxide was forced into the autoclave instead of 40 bar, c) the reaction temperature was 52° C. instead of 70° C., d) the reaction time was 14.6 hours instead of 5 hours, and e) no carbon monoxide was forced in during the polymerization.

7.8 g copolymer with an $\overline{M}_n$ of 38,500 was obtained. The polymerization rate was 84 g copolymer/(g palladium.hour).

EXAMPLE 9

A carbon monoxide/styrene copolymer was prepared in substantially the same way as in example 1, but with the following differences.

a) the catalyst solution was the same as that used in example 8, b) the water content was reduced to <25 ppmw as in example 3, c) 39 bar carbon monoxide was forced into the autoclave instead of 40 bar, d) the reaction temperature was 52° C. instead of 70° C., e) the reaction time was 14.3 hours instead of 5 hours, and f) no carbon monoxide was forced in during the polymerization.

8.2 g copolymer with an $\overline{M}_n$ 50,000 was obtained. The polymerization rate was 90 g copolymer/(g palladium.hour).

EXAMPLE 10

A carbon monoxide/styrene copolymer was prepared in substantially the same way as in example 1, but with the following differences:

a) a catalyst solution was used consisting of:
20 ml methanol,
0.06 mmol palladium acetate,
1.9 mmol 2,2'-bipyridine,
1.25 mmol trifluoromethanesulphonic acid, and
9.5 mmol 1,4-naphthoquinone, b) the water content was reduced to <25 ppmw as in example 3, c) the reaction temperature was 51° C. instead of 70° C., and d) the reaction time was 15.4 hours instead of 5 hours.

6.3 g copolymer with an $\overline{M}_n$ of 32,000 was obtained. The polymerization rate was 64 g copolymer/(g palladium.hour).

EXAMPLE 11

A carbon monoxide/styrene copolymer was prepared in substantially the same way as in example 1, but with the following differences:

a) a catalyst solution was used consisting of:
20 ml methanol,
0.06 mmol palladium acetate,
1.9 mmol 2,2'-bipyridine,
1.25 mmol trifluoromethanesulphonic acid, and
0.63 mmol 1,4-naphthoquinone, b) the water content was reduced to <25 ppmw as in example 3, c) the reaction temperature was 50° C. instead of 70° C., and d) the reaction time was 12.2 hours instead of 5 hours.

8.1 g copolymer with an $\overline{M}_n$ of 40,000 was obtained. The polymerization rate was 104 g copolymer/(g palladium.hour).

EXAMPLE 12

A carbon monoxide/styrene copolymer was prepared in substantially the same way as in example 1, but with the following differences:

a) a catalyst solution was used consisting of:
20 ml methanol,
0.06 mmol palladium acetate,
0.31 mmol 2,2'-bipyridine,
1.13 mmol trifluoromethanesulphonic acid, and
0.63 mmol 1,4-naphthoquinone, b) the water content was reduced to <25 ppmw as in example 3, c) the reaction temperature was 53° C. instead of 70° C., and d) the reaction time was 12 hours instead of 5 hours.

4.2 g copolymer with an $\overline{M}_n$ of 45,000 was obtained. The polymerization rate was 55 g copolymer/(g palladium.hour).

EXAMPLE 13

A carbon monoxide/styrene copolymer was prepared in substantially the same way as in example 1, but with the following differences:

a) a catalyst solution was used consisting of:
20 ml methanol,
0.06 mmol palladium acetate,
0.31 mmol 2,2'-bipyridine,
0.25 mmol trifluoromethanesulphonic acid, and
0.63 mmol 1,4-naphthoquinone, b) the water content was reduced to <25 ppmw as in example 3, c) the reaction temperature was 50° C. instead of 70° C., and d) the reaction time was 15 hours instead of 5 hours.

6.2 g copolymer with an $\overline{M}_n$ of 44,000 was obtained. The polymerization rate was 65 g copolymer/(g palladium.hour).

EXAMPLE 14

A carbon monoxide/styrene copolymer was prepared in substantially the same way as in example 1, but with the following differences:

a) a catalyst solution was used consisting of:
20 ml methanol,
0.06 mmol palladium acetate, 0.12 mmol 2,2'-bipyridine,
0.12 mmol trifluoromethanesulphonic acid, and
0.63 mmol 1,4-naphthoquinone,
b) the water content was reduced to <25 ppmw as in example 3,
c) the reaction temperature was 51° C. instead of 70° C., and
d) the reaction time was 14 hours instead of 5 hours.

7.2 g copolymer with an $\overline{M}_n$ of 38,000 was obtained. The polymerization rate was 80 g copolymer/(g palladium.hour).

EXAMPLE 15

A carbon monoxide/styrene copolymer was prepared in substantially the same way as in example 1, but with the following differences.
a) a catalyst solution was used consisting of:
20 ml methanol,
0.06 mmol palladium acetate,
0.06 mmol 2,2'-bipyridine,
0.06 mmol trifluoromethanesulphonic acid, and
0.63 mmol 1,4-naphthoquinone,
b) the water content was reduced to <25 ppmw as in example 3,
c) the reaction temperature was 50° C. instead of 70° C., and
d) the reaction time was 14.9 hours instead of 5 hours.

5.0 g copolymer with an $\overline{M}_n$ of 33,000 was obtained. The polymerization rate was 52 g copolymer/(g palladium.hour).

EXAMPLE 16

A carbon monoxide/styrene copolymer was prepared in substantially the same way as in example 1, but with the following differences:
a) the catalyst solution was the same as that used in example 8,
b) the water content was reduced to <25 ppmw as in example 3,
c) carbon monoxide was forced into the autoclave to a pressure of 20 bar instead of 40 bar,
d) the reaction temperature was 50° C. instead of 70° C., and
e) the reaction time was 15.5 hours instead of 5 hours.

12.8 g copolymer with an $\overline{M}_n > 50,000$ was obtained. The polymerization rate was 129 g copolymer/(g palladium.hour).

EXAMPLE 17

A carbon monoxide/styrene copolymer was prepared in substantially the same way as in example 1, but with the following differences:
a) the catalyst solution was the same as that used in example 8,
b) the water content was reduced to <25 ppmw as in example 3,
c) carbon monoxide was forced into the autoclave to a pressure of 70 bar instead of 40 bar,
d) the reaction temperature was 51° C. instead of 70° C., and
e) the reaction time was 15.6 hours instead of 5 hours.

5.7 g copolymer with an $\overline{M}_n$ of 46,000 was obtained. The polymerization rate was 57 g copolymer/(g palladium.hour).

EXAMPLE 18

A carbon monoxide/styrene copolymer was prepared in substantially the same way as in example 1, but with the following differences:
a) a catalyst solution was used consisting of:
20 ml methanol,
0.06 mmol palladium acetate,
0.31 mmol 3,3'-azo-2,2'-bipyridine,
0.31 mmol trifluoromethanesulphonic acid, and
0.63 mmol 1,4-naphthoquinone,
b) the water content was reduced to <25 ppmw as in example 3,
c) the reaction temperature was 50° C. instead of 70° C., and
d) the reaction time was 15.4 hours instead of 5 hours.

9.3 g copolymer with an $\overline{M}_n$ of 35,000 was obtained. The polymerization rate was 92 g copolymer/(g palladium.hour).

EXAMPLE 19

A carbon monoxide/styrene copolymer was prepared in substantially the same way as in example 1, but with the following differences:
a) a catalyst solution was used consisting of:
20 ml methanol,
0.06 mmol palladium acetate,
0.31 mmol 2,2'-bipyridine,
1.13 mmol hexafluorophosphoric acid, and
0.63 mmol 1,4-naphthoquinone,
b) the water content was reduced to <25 ppmw as in example 3,
c) the reaction temperature was 50° C. instead of 70° C., and
d) the reaction time was 15 hours instead of 5 hours.

5.0 g copolymer with an $\overline{M}_n$ of 31,000 was obtained. The polymerization rate was 51 g copolymer/(g palladium.hour).

EXAMPLE 20

A carbon monoxide/styrene copolymer was prepared in substantially the same way as in example 1, but with the following differences:
a) a catalyst solution was used consisting of:
20 ml methanol,
0.06 mmol palladium acetate,
0.31 mmol 2,2'-bipyridine,
1.13 mmol sulphuric acid, and
0.63 mmol 1,4-naphthoquinone,
b) the water content was reduced to <25 ppmw as in example 3,
c) the reaction temperature was 50° C. instead of 70° C., and
d) the reaction time was 15 hours instead of 5 hours.

7.3 g copolymer with an $\overline{M}_n$ of 33,000 was obtained. The polymerization rate was 74 g copolymer/(g palladium.hour).

Of the examples 1–20, examples 7–20 are according to the invention. In these examples, using catalyst compositions containing as component c) an acid with a pKa < −3, carbon monoxide/styrene copolymers were prepared with an $\overline{M}_n > 30,000$ at a polymerization rate > 50 g copolymer/(g palladium.hour). Examples 1–6 fall outside the scope of the invention. They have been included in the patent application for comparison. In these examples, using catalyst compositions containing as component c) an acid with a pKa > −3, carbon monoxide/styrene copolymers were prepared with an $\overline{M}_n < 20,000$.

Comparing the results of examples 1 and 2, carried out using a catalyst composition containing as component c) an acid with a pKa $> -3$, it can be seen that, although reducing the reaction temperature from 70° to 46° C. enabled an increase of the $\overline{M}_n$ from 10,100 to 19,000 to be obtained, this was accompanied by a decrease in the polymerization rate to a value beneath the practical limit of 50 g/(g.hour).

The favorable influence on $\overline{M}_n$ of the prepared polymers of drying the mixture to be polymerized can be seen by comparison of the result of example 8 (without drying: $\overline{M}_n = 38,500$) with that of example 9 (with drying: $\overline{M}_n > 50,000$) and by comparison of the result of example 1 (without drying: $\overline{M}_n = 10,100$) with those of examples 3 and 4 (with drying: $\overline{M}_n = 11,600$ and $\overline{M}_n = 13,000$ respectively).

The favorable influence of a low molecular ratio of 1,4-naphthoquinone/palladium acetate on $\overline{M}_n$ of the prepared polymers can be seen by comparison of the result of example 10 (ratio 158: $\overline{M}_n = 32,000$) with that of example 11 (ratio 11: $\overline{M} = 40,000$) and by comparison of the result of example 4 (ratio 158: $\overline{M}_n = 13,000$) with those of examples 5 and 6 (ratios 22 and 10 respectively: $\overline{M}_n = 16,000$ and 18,300 respectively).

It was established by $^{13}$C-NMR that the polymers prepared according to examples 1–20 were built up of linear chains in which the units from carbon monoxide on the one hand and the units from styrene on the other hand occurred in an alternating arrangement.

What is claimed is:

1. In a process for the production of a linear alternating polymer of carbon monoxide and styrene, by contacting carbon monoxide and styrene under polymerization conditions in the presence of a liquid reaction diluent and a catalyst composition to form a polymerization mixture, wherein the catalyst composition is formed from a palladium compound, a strong acid, a nitrogen bidentate ligand, and an organic oxidizing agent, the improvement wherein the acid has a pKa of less than $-3$, the polymerization mixture contains less than 50 ppm by weight water, and the polymer produced has a number average molecular weight above 30,000.

2. The process of claim 1 wherein the nitrogen bidentate ligand has the general formula

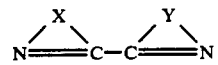

wherein X and Y represent identical or different organic bridging groups which each contain three or four atoms in the bridge, at least two of which are carbon atoms.

3. The process of claim 2 wherein the palladium compound is a carboxylic acid salt.

4. The process of claim 2 wherein, in the bidentate in nitrogen ligand, the bridging groups X and Y are identical.

5. The process of claim 2 wherein the strong acid is trifluoromethanesulfonic acid.

6. The process of claim 2 wherein the organic oxidizing agent is a 1,4-quinone.

7. The process of claim 2 wherein the reaction diluent is a lower aliphatic alcohol.

8. The process of claim 2 wherein the catalyst composition contains 2.5 to 50 moles of an organic oxidizing agent per mole of palladium.

9. The process of claim 8 wherein the catalyst composition contains 0.5 to 100 moles nitrogen bidentate ligand and 1 to 100 moles strong acid, each per mole of palladium.

10. The process of claim 8 wherein the catalyst composition contains 1 to 50 moles nitrogen bidentate ligand, 2 to 50 moles strong acid, and 5 to 25 moles of an organic oxidizing agent, each per mole of palladium.

11. The process of claim 8 wherein the polymerization mixture contains less than 25 ppm by weight water.

12. The process of claim 8 wherein the water content of the polymerization mixture is reduced by adding to the mixture a combination of trimethylorthoformiate and para-toluenesulphonic acid as a drying agent.

13. The process of claim 8 wherein the polymer is a styrene/carbon monoxide polymer.

14. The process of claim 8 wherein the polymer is a substituted styrene/carbon monoxide polymer.

15. The process of claim 8 wherein the strong acid of the catalyst composition is selected from the group consisting of tetrafluoroboric acid, hexafluorophosphoric acid, hexafluoroantimonic acid, and hexafluorosilic acid.

* * * * *